United States Patent [19]

Marinik

[11] 4,052,357

[45] Oct. 4, 1977

[54] HIGH MODULUS SILICONE RUBBER

[75] Inventor: James A. Marinik, Midland, Mich.

[73] Assignee: Dow Corning Corporation, Midland, Mich.

[21] Appl. No.: 687,733

[22] Filed: May 19, 1976

[51] Int. Cl.$^2$ ............................................. C08L 83/04
[52] U.S. Cl. ................................................ 260/37 SB
[58] Field of Search ................ 260/37 SB; 106/50, 51

[56] References Cited

U.S. PATENT DOCUMENTS

| 3,839,266 | 10/1974 | Bargain | 260/37 SB |
| 3,867,158 | 2/1975 | Hopkins | 106/51 |
| 3,919,161 | 11/1975 | Glaister et al. | 260/37 SB |

FOREIGN PATENT DOCUMENTS

| 199,368 | 7/1967 | U.S.S.R. | 106/51 |

*Primary Examiner*—Lewis T. Jacobs

*Attorney, Agent, or Firm*—Roger H. Borrousch

[57] ABSTRACT

A silicone rubber composition prepared from a mixture of 100 parts by weight polydiorganosiloxane gum, 25 to 75 parts by weight of a reinforcing silica filler, 5 to 20 parts by weight of a hydroxylated diorganosilicon compound having about two hydroxyl radicals per molecule and the organic radicals are 10 to 50 percent phenyl, 2 to 20 percent vinyl and the remainder methyl, fiberized blast furnace slag fibers in amounts of 20 to 80 parts by weight and 0 to 10 parts by weight of alkoxy silicon compound having at least 25 weight percent alkoxy radical provides a silicone rubber when cured which has a high modulus, improved tear strength and can be made oil resistant by adding magnesium oxide to the composition. This silicone rubber can be used for seals, gaskets and particularly where magnesium oxide is present the use can be in contact with oils.

18 Claims, No Drawings ated diorganosilicon compound can be prepared by

HIGH MODULUS SILICONE RUBBER

BACKGROUND OF THE INVENTION

1. Field of the Invention

This invention relates to silicone rubber compositions prepared from a gum and methods of preparing same and the silicone rubber.

2. Description of the Prior Art

The use of fibers or fibrous materials in polymeric materials are generally known to produce products with useful properties. The use of fibers of fibrous materials in silicone rubber compositions have been somee gums or because the fibers have deleterious effects on the silicone rubber under use conditions. One such fibrous materials is fibrous chrysotile asbestos. This asbestos rapidly reduces the physical properties of the silicone rubber upon heat aging unless an alkoxylated silicon compound was added to stabilize the asbestos. This stabilization is taught by Metevia et al. in U.S. Pat. No. 3,453,228. As illustrated by Metevia et al., to use fibrous materials or fibers in silicon rubber, some special means is usually required, in the ingredients used, the method of preparation or both.

Recently available fibers as used in silicone rubber compositions of this invention also require the presence of certain ingredients to achieve combinations of high tensile strength, high modulus and high tear strength.

SUMMARY OF THE INVENTION

An object of this invention is to provide a silicone rubber composition which can be cured to a silicone rubber with a combination of high modulus and high tear strength.

This invention relates to a silicone rubber composition comprising a diorganosiloxane gum, a reinforcing silica filler, a hydroxylated diorganosilicon compound, fiberized blast furnace slag fibers and, optionally, an alkoxy silicon compound. This composition can be improved in oil resistant properties by including in the composition magnesium oxide.

This invention also relates to a method of preparing these silicone rubber compositions by combining the ingredients, particularly in the presence of ammonium carbonate, and heating the mixture at reduced pressure for at least 30 minutes at 100° to 200° C. Those compositions which contain magnesium oxide can be prepared by adding the magnesium oxide either before or after the heating step.

The cured silicone rubbers of this invention can be used as seals, gaskets or other such applications which require high modulus silicone rubber. The silicone rubbers containing the magnesium oxide are particularly usefuls as shaft seals because of the oil resistant property.

DESCRIPTION OF THE INVENTION

This invention relates to a silicone rubber composition comprising (A) 100 parts by weight of polydiorganosiloxane gum where the organic radicals are selected from methyl, phenyl, vinyl, ethyl and 3,3,3-trifluoropropyl and mixtures thereof, the polydioganosiloxane gum having at least 50 percent of the organic radicals being methyl and no more than 2 percent being vinyl, the polydiorganosiloxane gums being endblocked with hydroxyl radicals or triorganosiloxy units where the organic radicals are defined above, (B) from 25 to 75 parts by weight of reinforcing silica filler, (C) from 5 to 20 parts by weight of hydroxylated diorganosilicon compound, which has an average of about 2 hydroxyl radicals per molecule, at least 3 weight percent silicon-bonded hydroxyl radicals based on the weight of the hydroxylated diorganosilicon compound, and the organic radicals are selected from a combination of methyl, phenyl and vinyl, there being from 10 to 50 percent phenyl radicals, from 2 to 20 percent vinyl radicals and the remainder being methyl radicals, (D) from 20 to 80 parts by weight fiberized blast furnace slag fibers having an average length of from 0.0001 to 0.0005 meter and a diameter of 0.000001 to 0.00001 meter, and (E) from 0 to 10 parts by weight of alkoxy silicon compound having at least 25 weight percent silicon-bonded alkoxy radical selected from methoxy, ethoxy, and propoxy and any remaining monovalent organic groups attached to silicon atoms being bonded through silicon-carbon bonds and being selected from methyl, ethyl and vinyl.

The polydiorganosiloxane gums for this invention are well known in the art. The gums can be made up of repeating diorganosiloxane units, such as dimethylsiloxane units, phenylmethylsiloxane units, diphenylsiloxane units, methylvinylsiloxane units, methylethylsiloxane units and 3,3,3-trifluoropropylmethylsiloxane units. Within the scope of polydiorganosiloxane gum, other units such as monoorganosiloxane units and $SiO_2$ units can be present to provide some polymer branching. The polydiorganosiloxane gums can be terminated with hydroxyl radicals or triorganosiloxy units, such as trimethylsiloxane units, dimethylvinylsiloxy units and phenylmethylvinylsiloxy units. The gums have viscosities at 25° C. greater than 1,000 pascal-seconds (Pa.s) and preferably greater than 5,000 Pa.s. At least 50 percent of the organic radicals of the polydiorganosiloxane gum are methyl radicals and no more than 2 percent of the organic radicals are vinyl radicals, preferably from 0.1 to 0.5 percent vinyl radicals.

The reinforcing silica filler, (B), can be, for example, a fume silica, a precipitated silica and a silica aerogel. Other fillers such as extending fillers can also be present, such as calcium carbonate, crushed quartz, diatomaceous earth, titanium dioxide and carbon black. The extending fillers can be used in amounts up to 50 parts by weight per 100 parts by weight of gum (A).

The hydroxylated diorganosilicon compound (C) has an average of about 2 hydroxyl radicals per molecule. The hydroxylated diorganosilicon compound has at least 3 weight percent silicon-bonded hydroxyl radical based on the weight of compound (C). The organic radicals of (C) are a combination of methyl, phenyl and vinyl. The phenyl is present in an amount of from 10 to 50 percent, the vinyl is present in an amount of from 2 to 20 percent and the remainder of the organic radicals are methyl radicals which makes up 100 percent of the organic radicals. The hydroxylated diorganosilicon compound can be a single compound or a mixture of compounds. For example, the hydroxylated diorganosilicon compound can be a mixture of a hydroxyl endblocked polydimethylsiloxane fluid, a hydroxyl endblocked polymethylvinylsiloxane fluid and diphenylsilanediol, a mixture of a hydroxyl endblocked polymethylvinylsiloxane fluid and a hydroxyl endblocked polydiorganosiloxane fluid composed of dimethylsiloxane units and diphenylsiloxane units or a hydroxyl endblocked polydiorganosiloxane fluid composed of dimethylsiloxane units, diphenylsiloxane units and methylvinylsiloxane units.

The fiberized blast furnace slag fibers (D) are inorganic or mineral fibers which are obtained by processing blast furnace slag. These fibers have an average length of 0.0001 to 0.0005 meter with a diameter of 0.000001 to 0.00001 meter. One specific example of a fiberized blast furnace slag fiber by analysis shows the following components, which, however, do not specifically reflect the chemical structure, 42.1 percent by weight $SiO_2$, 35.4 percent by weight CaO, 8.1 percent by weight $A1_2O_3$, 7.8 percent by weight MgO and 6.6 percent by weight other inorganics. This particular fiber has a specific gravity of 2.7, a tensile strength of 20.7 to 1379 megapascals, an average tensile strength for a single fiber of 482.6 megapascals, a modulus of elasticity of 103.4 gigapascals, a glass transition temperature, $T_g$, of 760° C., a devitrification temperature, $T_{dev}$, of 849° C., and a melting point, $T_{fus}$, of 1260° to 1360° C.

The alkoxy silicon compound, (E), can be alkoxy silanes or siloxanes which have at least 25 weight percent silicon-bonded alkoxy radical selected from methoxy, ethoxy or propoxy. The alkoxy silicon compound can contain monovalent organic radicals bonded to silicon atoms through silicon-carbon bonds and include methyl, ethyl and vinyl. These alkoxy silicon compounds can be illustrated by methyltrimethoxysilane, vinyltrimethoxysilane, ethyltriethoxysilane, tetraethylorthosilicate, partial hydrolyzates of the silanes such as ethylpolysilicate, and mixtures such as ethylpolysilicate and methyltrimethoxysilane, dimethyldimethoxysilane and methyltrimethoxysilane, and tetraethylorthosilicate, methyltrimethoxysilane and vinyltrimethoxysilane. Preferably, the alkoxy silicon compound is methyltrimethoxysilane. The alkoxy silicon compound, (E), preferably has at least 35 weight percent silicon-bonded alkoxy.

The compositions of this invention are best prepared by mixing ingredients (A), (B), (C), (D) and (E) and heating this mixture under reduced pressure for at least 30 minutes at a temperature in the range of 100° to 200° C., preferably for at least 1 hour at a temperature of 110° to 180° C. The heating step is preferably carried out with ammonium carbonate or ammonium bicarbonate present in amounts of from 0.01 to 1 part by weight per 100 parts by weight of gum (A). An alternative method is to heat only ingredients (A), (B) and (C) and then add ingredients (D) and (E) after the heating step. This alternative has a tendency to be inconsistent and somewhat lower values for tear strength. Although (E) is not a necessary ingredient to improve the tear strength of the cured silicone rubber, it is preferred to use (E) in amounts of from 2 to 10 parts by weight based on 100 parts by weight of (A). After the heating step, the mixture is cooled below 100° C., and can be stored for later use or it can be catalyzed for vulcanization, such as with an organic peroxide. The method of vulcanization is not narrowly critical and many kinds of vulcanization which are known in the art can be used and such methods as radiation curing, for example, gamma radiation can be used. Practically, an organic peroxide is used for vulcanization. The organic peroxides can be grouped into two categories, a non-specific organic peroxide and a vinyl specific organic peroxide. The non-specific organic peroxides include, for example, benzoyl peroxide, 2,4-dichlorobenzoyl peroxide and tertiary-butyl perbenzoate. The vinyl specific organic peroxides include, for example, ditertiary-butyl peroxide, dicumyl peroxide and 2,5-bis(tertiary-butylperoxy)-2,5-dimethylhexane. The vinyl specific organic peroxides are preferably used with gum (A) having from 0.1 to 0.5 percent vinyl radical. The amount of organic peroxide preferably is from 0.1 to 5 parts by weight based on the weight of the gum (A).

The silicone rubbers are prepared by heating the peroxide containing compositions above the activation temperature of the peroxide for sufficient time to vulcanize the silicone rubber composition. The activation temperatures and times for cure vary with the particular peroxide being used, but generally a temperature between 150° to 180° C. for 3 to 10 minutes is sufficient to vulcanize most compositions. Some compositions may be improved in physical properties if given a post cure, such as for 2 hours at 200° C.

The silicone rubber can be made to have improved oil resistance by including in the composition finely divided magnesium oxide in amounts up to 10 parts by weight per 100 parts by weight of gum (A). Preferably, the amounts can be from 4 to 8 parts by weight magnesium oxide per 100 parts by weight gum (A). The magnesium oxide can be added either before the heating step or after the heating step. The oil resistance referred to is in oils found in the motorized equipment, such as engine oils and other lubricating oils, such as transmission oils.

The silicone rubber compositions can also be prepared which contain other known additives for silicone rubbers such as heat stability additives, for example, ferric oxide, ceric hydrate, zinc borate and barium zirconate; flame retardant additives, for example, platinum, carbon black, and fumed titanium dioxide; antioxidants, pigments and colorants; and adhesion promotors.

The cured silicone rubber of this invention results in a product which has increased modulus and tear strength compared to cured silicone rubbers prepared without the fibers as well as improved properties over cured silicone rubber with fibers but without the hydroxylated diorganosilicon compound as defined. In many prior art silicone rubbers, one finds that when one property is increased another is decreased and comprises are often sought. For example, high modulus silicone rubbers are known, but the tear strengths are usually decreased, whereas high tear strength silicone rubbers are known but the modulus is decreased. The present silicone rubbers do not obtain the highest tear strengths known but for high modulus silicone rubbers, these are considered high tear strength silicone rubbers.

These silicone rubbers find use in seals, gaskets, tubing and other articles where a high modulus silicone rubber is needed with high tear strength. When magnesium oxide is present the silicone rubber finds use as a shaft seal, because of its oil resistance.

The following examples are presented for illustrative purposes only and should not be construed as limiting the invention which is properly delineated in the claims. All parts are parts by weight unless otherwise specified.

EXAMPLE 1

A. A silicone rubber composition was prepared by mixing in a commercial dough mixer, 100 parts of dimethylvinylsiloxy endblocked polydiorganosiloxane gum having a Williams plasticity of about 1.5 mm and composed of 99.77 mol percent dimethylsiloxane units and 0.23 mol percent methylvinylsiloxane units (hereinafter referred to as Gum A), 45 parts of fume silica filler, 10 parts of a hydroxyl endblocked polydiorganosiloxane having from 9 to 13 weight percent silicon-bonded hydroxyl radicals and composed of 67 mol percent dimethylsiloxane units and 33 mol percent diphenysiloxane units (hereinafter referred to as Compound A), 1.0 part hydroxyl endblocked polymethylvinylsiloxane having from 4.0 to 5.5 weight percent silicon-bonded hydroxyl radical (hereinafter referred to as Compound B), 5 parts methyltrimethoxysilane, 50 parts of fiberized blast furnace slag fibers having an average length of 0.000275 meter and an average diameter of 0.000005 meter and further defined herein as the specific example of a fiberized blast furnace slag fiber, and 0.5 part of ammonium carbonate. The resulting mixture was heated under reduced pressure at 120° C. for 1 hour, it was then cooled to about room temperature and 6.5 parts of finely divided magnesium oxide, 1.09 part of an equal weight mixture of 2,5-bis(tertiary-butylperoxy)2,5-dimethylhexane and an inert filler, and 3.26 parts of an equal weight mixture of ferric oxide and dimethylvinylsiloxy endblocked polydiorganosiloxane gum having a Williams plasticity of about 1.5 mm and composed of 99.858 mol percent dimethylsiloxane units and 0.142 mol percent methylvinylsiloxane units (hereinafter referred to as Gum B) were milled into the cooled mixture.

B. A silicone rubber composition was prepared as described in A. except the ammonium carbonate was left out.

C. A silicone rubber composition was prepared as described in A. except 0.1 part of ammonium carbonate was used in place of the 0.5 part of ammonium carbonate.

D. A silicone rubber composition was prepared as described in A. except 2.3 part of fume titanium dioxide and the magnesium oxide were included in the mixture prepared in the dough mixer and no magnesium oxide was added after the heating step.

E. A silicone rubber composition was prepared as described in A. except Gum A was replaced by dimethylvinylsiloxy endblocked polydiorganosiloxane having a Williams plasticity of about 1.5 mm and composed of 99.73 mol percent dimethylsiloxane units and 0.27 mol percent methylvinylsiloxane units.

F. A silicone rubber composition was prepared by mixing in a commercial dough mixer, 94 parts of Gum A, 45 parts of fume silica filler, 10 parts of Compound A, 1.0 part of Compound B, 50 parts of the fibers defined in A., 5 parts methylytrimethyoxysilane, 0.1 part ammonium carbonate and 13 parts of an equal weight mixture of magnesium oxide and Gum B. The resulting mixture was heated under reduced pressure at 120° C. for 1 hour, it was then cooled to about room temperature and 1.09 parts of an equal weight mixture of 2,5-bis(tertiary-butylperoxy)-2,5-dimethylhaxane and an inert filler and 3.27 parts of an equal weight mixture of ferric oxide and Gum B were milled into the cooled mixture.

G. A silicone rubber composition was prepared by mixing in a commercial dough mixer, 100 parts of polydiorganosiloxane having a Williams plasticity of about 1.5 mm, having both hydroxyl an dimethylvinylsiloxy endblocking, and composed of 99.78 mol percent dimethyl-siloxane units and 0.22 mol percent methylvinylsiloxane units, 45 parts of fume silica filler, 10 parts of Compound A, 1.0 part of Compound B, 50 parts of the fiber defined in A., 5.0 parts of methyltrimethoxysilane, 2.3 parts of fume titanium dioxide, 0.5 part of ammonium carbonate and 6.5 parts of finely divided magnesium oxide. The resulting mixture was heated under reduced pressure at 120° C. for 1 hour, it was then cooled to about room temperature an 1.1 parts of an equal weight mixture of 2,5-bis(tertiary-butylperoxy)-2,5-dimethylhexane and an inert filler and 3,3 parts of an equal weight mixture of ferric oxide and Gum B were milled into the cooled mixture.

H. A silicone rubber composition was prepared as described in G., except the gum was replaced with a gum composed of 99.75 mol percent dimetylsiloxane units and 0.25 mol percent methylvinylsiloxane units.

I. A silicone rubber composition was prepared as described in G. except the gum was replaced with gum composed of 99.67 mol percent dimethylsiloxane units and 0.33 mol percent methylvinylsiloxane units.

The above silicone rubber compositions were press cured at the temperatures and for the length of time as indicated in Table I. Silicone rubber compositions A. Run No. 3., B., D., E. and F. were given post cures of 2 hours at 200° C. The physical properties were determined by the following procedures and the results were as shown in Table I. The durometer was determined by ASTM-D-2240 with the results reported from the Shore A scale. The tensile strength at break and elongation at break were determined by ASTM-D-412 with the results reported in kilopascals (kPa) and percent, respectively. The modulus was determined by ASTM-D-412, at 100 percent elongation with the results reported in kPa. The tear strength was determined by ASTM-D-624 with Die B and with the results reported in newton per meter (N/m). The compression set was determined by ASTM-D-395 after 22 hours at 177° C. with the results reported in percent. The cured samples of Run No. 2. and Run No. 3. were submerged in separate tests in Dexron II ATF and ASTM No. 3 Oil. The physical properties were determined on the samples after being submerged for 168 hours at 150° C. The results were as shown in Table II.

Table I

| Run No. | Composition | Cure Conditions Time, Min. | Temperature ° C. | Durometer | Tensile Strength kPa | Elongation | Tear Strength N/m | Modulus kPa | Compression Set |
|---|---|---|---|---|---|---|---|---|---|
| 1. | A | 4 | 190 | 78 | 7067 | 90 | 29,421 | — | — |
| 2. | A | 10 | 190 | 78 | 7239 | 70 | 36,076 | — | 26.6 |
| 3. | A | 10 | 190 | — | 8094 | 50 | — | — | — |
| 4. | B | 10 | 171 | 82 | 6619 | 100 | 27,495 | 6619 | 19.7 |
| 5. | C | 10 | 171 | 79 | 6357 | 120 | 26,619 | 6067 | 21.9 |
| 6. | D | 10 | 171 | 80 | 7515 | 60 | 26,269 | — | 18.9 |
| 7. | E | 10 | 171 | 79 | 6343 | 110 | 27,320 | 5688 | 24.8 |
| 8. | F | 10 | 171 | 80 | 6412 | 90 | 28,546 | — | — |
| 9. | G | 4 | 190 | 81 | 6274 | 100 | 29,246 | 6067 | 17.5 |
| 10. | H | 4 | 190 | 79 | 6550 | 110 | 27,320 | 6136 | 17.6 |
| 11. | I | 4 | 190 | 80 | 6136 | 150 | 27,320 | 5723 | 17.8 |

Table II

| Run No. | Duro-meter | Duro-meter Change | Tensile Strength kPa | % Change In Tensile | Elong-ation % | % Change In Elong-ation | Volume Swell, % |
|---|---|---|---|---|---|---|---|
| 2. Dexron II ATF | 68 | −10 | 665 | −36.7 | 160 | +128.6 | +25.7 |
| 2. ASTM No. 3 Oil | 67 | −11 | 850 | −19.0 | 70 | 0.0 | +30.3 |
| 3. Dexron II ATF | 68 | — | 680 | −42.1 | 160 | +220 | +29.5 |
| 3. ASTM No. 3 Oil | 68 | — | 795 | −32.3 | 70 | +40 | +31.1 |

EXAMPLE 2

A. A silicone rubber composition was prepared by mixing in a commercial dough mixer 100 parts of dimethylvinylsiloxy endblocked polydiorganosiloxane gum having a Williams plasticity of about 1.5 mm and composed of 99.79 mol percent dimethylsioxane units and 0.21 mol percent methylvinylsiloxane units (hereinafter referred to as Gum C), 45 parts of fume silica filler, 1.0 part of Compound B, 7 parts of a hydroxyl endblocked polydimethylsiloxane having a silicon-bonded hydroxyl content between 3.7 and 4.2 weight percent (hereinafter referred to as Compound C), 4.0 part of diphenylsilanediol, 1.0 part of dimethylvinylsiloxy endblocked polydiorganosiloxane having a viscosity range of 8 to 25 pascal-seconds (Pa.s (hereinafter referred to as Compound D). The resulting mixture was heated under reduced pressure for three hours at a temperature in the range of 170° to 180° C. with a nitrogen purge and it was then cooled to about room temperature. To 100 parts of the cooled mixture, 50 parts of the fiber defined in Example 1, A., 5 parts of ethylpolysilicate and 0.775 part of an equal weight mixture of 2,5-bis(tertiary-butylperoxy)-2,5-dimethylhexane and an inert filler were added by milling.

B. A silicone rubber composition was prepared as described in A. above, except 30 parts of fiber was substituted for the 50 parts.

C. A silicone rubber composition was prepared as described in A. above through the heating step. To the cooled mixture, 40 parts of fiber as defined in Example 1, A. and 4 parts of ethylpolysilicate were added on a mill. To 100 parts of this fiber containing mixture 3.0 parts of finely divided magnesium oxide, 1.5 parts of an equal weight mixture of ferric oxide and Gum B and 0.5 part of an equal weight mixture of 2,5 -bis(tertiary-butylperoxy)-2,5-dimethylhexane and an inert filler were added on a mill.

D. A silicone rubber composition was prepared as described in C. above, except the fibers and ethylpolysilicate were added to the mixture before the heating step.

E. A silicone rubber composition was prepared as described in C. above, except 4.0 parts of methyltrimethoxysilane was used in place of 4.0 parts of ethylpolysilicate.

F. A silicone rubber composition was prepared as described in E. above except the fibers and the methyltrimethoxysilane were added to the mixture before the heating step.

G. A silicone composition was prepared as described in A. above through the heating and cooling steps. To 100 parts of the cooled mixture, 50 parts of fibers as defined in Example 1, A. and 5 parts of ethylpolysilicate were milled into the cooled mixture. To 100 parts of this new mixture, 3.5 parts of finely divided magnesium oxide, 1.5 parts of an equal weight mixture of ferric oxide and Gum B and 0.5 an equal weight mixture of 0.5 part of 2,5-bis(tertiary-butylperoxy)-2,5-dimethylhexane and an inert ingredient were added by milling.

H. A silicone rubber composition was prepared as described in A. above through the heating and cooling steps. To 100 parts of the cooled mixture, 30 parts of fiber as described in Example 1, A., 4 parts of ethylpolysilicate, 1.5 parts of an equal weight mixture of ferric oxide and Gum B, 1.0 part of an equal weight mixture of 2,5-bis(tertiary-butylperoxy)-2,5-dimethylhexane and an inert filler and 4 parts of a mixture of 50 parts of zinc borate, 36.9 parts Gum B, 9.3 parts fume silica filler and 3.8 parts of Compound C were added by milling.

I. A silicone rubber composition was prepared as described in A. above through the heating and cooling steps. To 100 parts of the cooled mixture, 50 parts of the fiber defined in Example 1, A., 1.5 parts of an equal weight mixture of ferric oxide and Gum B, 3.0 parts of ethylpolysilicate and 0.8 part of an equal weight mixture of 2,5-bis(tertiary-butylperoxy)-2,5-dimethylhexane and an inert filler were added by milling.

The above silicone rubber compositions were cured by press molding for the times and temperatures defined in Table III. The properties were determined as described in Example 1 and the results were as shown in Table III. The cured samples of Run Nos. 9 through 16 were submerged in Dexron$^R$ II ATF* for 168 hours at 150° C. before the physical properties were determined. The properties were determined as described in Example 1 and were as shown in Table IV.

*Dexron$^R$ automatic transmission fluid, Texamatic Fluid-TL 8570, Texaco Inc., New York City, New York 10017

Table III

| Run No. | Compo-sition | Cure Conditions Time, Min. | Cure Conditions Temper-ature ° C. | Post Cure Conditions Time, Hours | Post Cure Conditions Temper-ature ° C. | Duro-meter | Tensile Strength kPa | Elong-ation % | Tear Strength N/m | Compres-sion Set |
|---|---|---|---|---|---|---|---|---|---|---|
| 1. | A | 10 | 171 | — | — | 79 | 4999 | 200 | 23,117 | 68.9 |
| 2. | A | 10 | 171 | 2 | 200 | 82 | 6619 | 90 | 32,398 | — |
| 3. | A | 5 | 180 | — | — | 80 | 4895 | 180 | 26,794 | 63.7 |
| 4. | A | 4 | 184 | — | — | 82 | 4930 | 180 | 27,145 | 66.7 |
| 5. | B | 10 | 171 | — | — | 73 | 6067 | 230 | 20,315 | 60.9 |
| 6. | B | 10 | 171 | 2 | 200 | 81 | 5412 | 150 | 27,320 | — |
| 7. | B | 5 | 180 | — | — | 79 | 5516 | 210 | 22,416 | 63.0 |
| 8. | B | 4 | 184 | — | — | 79 | 5792 | 220 | 23,467 | 65.1 |
| 9. | C | 10 | 171 | — | — | 76 | 6136 | 240 | 20,315 | 33.1 |

Table III-continued

| Run No. | Composition | Cure Conditions Time, Min. | Temperature °C | Post Cure Conditions Time, Hours | Temperature °C | Durometer | Tensile Strength kPa | Elongation % | Tear Strength N/m | Compression Set |
| --- | --- | --- | --- | --- | --- | --- | --- | --- | --- | --- |
| 10. | C | 10 | 171 | 2 | 200 | 79 | 5792 | 200 | 22,066 | 32.8 |
| 11. | D | 10 | 171 | — | — | 76 | 6205 | 210 | 18,914 | 28.8 |
| 12. | D | 10 | 171 | 2 | 200 | 79 | 5929 | 190 | 20,490 | 26.2 |
| 13. | E | 10 | 171 | — | — | 78 | 5792 | 170 | 24,693 | 23.7 |
| 14. | E | 10 | 171 | 2 | 200 | 79 | 5792 | 170 | 18,388 | 21.8 |
| 15. | F | 10 | 171 | — | — | 76 | 4964 | 170 | 19,789 | 22.7 |
| 16. | F | 10 | 171 | 2 | 200 | 78 | 5723 | 140 | 20,665 | 25.4 |
| 17. | G | 10 | 171 | 2 | 200 | 81 | 5378 | 130 | 39,053 | 36.1 |
| 18. | H | 10 | 171 | — | — | 79 | 5826 | 230 | 20,140 | — |
| 19. | H | 10 | 171 | 4 | 200 | 80 | 6033 | 120 | 22,766 | — |
| 20. | I | 10 | 171 | — | — | 79 | 5792 | 230 | 19,089 | — |
| 21. | I | 10 | 171 | 4 | 200 | 80 | 5792 | 70 | 20,665 | — |

Table IV

| Run No. | Durometer | Durometer Change | Tensile Strength kPa | % Change In Tensile | Elongation % | % Change In Elongation |
| --- | --- | --- | --- | --- | --- | --- |
| 9. | 56 | −20 | 3275 | −46.6 | 230 | −4.2 |
| 10. | 52 | −27 | 3309 | −42.9 | 230 | +15.0 |
| 11. | 58 | −18 | 4344 | −30.0 | 220 | −4.8 |
| 12. | 60 | −19 | 4206 | −29.1 | 200 | +5.0 |
| 13. | 64 | −14 | 4619 | −20.3 | 190 | +11.8 |
| 14. | 65 | −14 | 4688 | −19.1 | 190 | +11.8 |
| 15. | 63 | −13 | 4171 | −16.0 | 180 | +5.9 |
| 16. | 63 | −15 | 4206 | −26.5 | 150 | +7.1 |

EXAMPLE 3

A. A silicone rubber composition was prepared by mixing in a commercial dough mixture, 100 parts of Gum A, 45 parts of fume silica filler, 7.0 parts of Compound C, 1.0 part of Compound B, 1.0 parts of Compound D, 4.0 part of diphenylsilanediol, 50 parts of the fibers described in Example 1, A. and 4.0 parts of methyltrimethoxysilane. The resulting mixture was heated under reduced pressure at 120° C. for 1 hour, it was then cooled and 6.5 parts of finely divided magnesium oxide was milled into the cooled mixture. To 100 parts of the resulting magnesium oxide containing mixture, 1.5 parts of an equal weight mixture of ferric oxide and Gum B and 0.6 part of an equal weight mixture of 2,5-bis(tertiary-butylperoxy)-2,5-dimethylhexane and an inert filler were added by milling.

B. A silicone rubber composition was prepared as described in A. above, except 5.0 parts of methyltrimethoxysilane was used in place of the 4.0 parts of methyltrimethoxysilane.

C. A silicone rubber composition was prepared as described in A. above, except 6.0 parts of methyltrimethoxysilane was used in place of the 4.0 parts of methyltrimethoxysilane.

D. A silicone rubber composition was prepared as described in A. above, except 7.5 parts of methyltrimethoxysilane was used in place of the 4.0 parts of methyltrimethoxysilane.

The above silicone rubber compositions were cured by press molding for 10 minutes at 171° C. and then post cured for 2 hours at 200° C. Run No. 2 were the properties of the cured silicone rubber without post curing. The properties were determined as described in Example 1 and the results were as shown in Table V.

Table V

| Run No. | Composition | Durometer | Tensile Strength kPa | Elongation % | Tear Strength N/m | Modulus kPa | Compression Set % |
| --- | --- | --- | --- | --- | --- | --- | --- |
| 1. | A | 82 | 5619 | 80 | 25,393 | — | 18.6 |
| 2. | B | 78 | 5378 | 120 | 21,716 | 5378 | 21.1 |
| 3. | B | 84 | 5998 | 90 | 23,817 | — | 19.0 |
| 4. | C | 82 | 5929 | 90 | 23,117 | — | 16.4 |
| 5. | D | 84 | 5929 | 80 | 24,343 | — | 17.4 |

EXAMPLE 4

A. A silicone rubber composition was prepared by mixing in a commercial dough mixer, 100 parts of Gum C, 50 parts of fumed silica filler, 9 parts of Compound C, 1.0 part of Compound B, 1.0 part of Compound D and 4.0 parts of diphenylsilanediol. The resulting mixture was heated under reduced pressure for 3 hours at a temperature in the range of 170° to 180° C. with a nitrogen purge and it was then cooled to about room temperature. To this cooled mixture, 24 parts of diatomaceous earth and 32 parts of five micron crushed quartz was added on a mill. To 100 parts of the milled mixture, 3.7 parts of diatomaceous earth, 1.5 parts of an equal weight mixture of ceric hydrate and a hydroxyl endblocked polydimethylsiloxane gum having a Williams plasticity of about 1.7 mm, 1.5 parts of an equal weight mixture of ferric oxide and Gum B and 4.5 parts of a mixture of 50 parts zinc borate, 36.9 parts Gum B, 9.3 parts fume silica filler and 3.8 parts of Compound C were added by milling. This composition was vulcanized by milling into 100 parts, 0.41 parts of an equal weight mixture of 2,5-bis(tertiary-butylperoxy)-2,5-dimethylhexane and an inert filler. This composition was presented as an illustration of a high modulus silicone rubber of the prior art and is presented for comparative purposes only.

B. A silicone rubber composition was prepared as described in Example 1, A. except the 5 parts of methyl trimethoxysilane was left out and 0.55 part of ammonium carbonate was used in place of the 0.5 part of ammonium carbonate.

C. A silicone rubber composition was prepared as described in Example 1, A. except the fibers and the 5 parts of methyltrimethoxysilane were tumbled together before adding to the mixture and 0.05 part of ammonium carbonate was used in place of the 0.5 part by weight ammonium carbonate.

Compositions A., B. and C. were press cured for the times and temperatures shown in Table VI. Samples of compositions B. and C. were given post cures as indicated in Table VI. The physical properties were determined as described in Example 1 and were as shown in Table VI.

7. The composition in accordance with claim 1 in which there is present finely divided magnesium oxide in amounts up to 10 parts by weight per 100 parts by weight polydiorganosiloxane gum.

8. The composition in accordance with claim 6 in which there is present finely divided magnesium oxide in amounts up to 10 parts by weight per 100 parts by weight polydiorganosiloxane gum.

Table VI

| Run No. | Composition | Cure Conditions Time, Min. | Cure Conditions Temperature °C. | Post Cure Conditions Time, Hours | Post Cure Conditions Temperature °C. | Durometer | Tensile Strength kPa | Elongation % | Tear Strength N/m | Compression Set % | Modulus, kPa |
|---|---|---|---|---|---|---|---|---|---|---|---|
| 1. | A | 10 | 171 | — | — | 80 | 8156 | 150 | 17,513 | 29.8 | 6550 |
| 2. | A | 4 | 190 | — | — | 81 | 7929 | 170 | 21,015 | 24.4 | 6205 |
| 3. | B | 4 | 190 | — | — | 74 | 6378 | 130 | 22,942 | 21.6 | — |
| 4. | B | 4 | 190 | 2 | 200 | 75 | 7033 | 110 | 27,845 | — | — |
| 5. | C | 4 | 190 | — | — | 75 | 5998 | 210 | 23,467 | 15.8 | — |
| 6. | C | 4 | 190 | 2 | 200 | 77 | 6274 | 150 | 24,167 | — | — |

That which is claimed is:

1. A silicone rubber composition consisting essentially of
   A. 100 parts by weight of polydiorganosiloxane gum where the organic radicals are selected from methyl, phenyl, vinyl, ethyl and 3,3,3-trifluoropropyl and mixtures thereof the polydiorganosiloxane gum having at least 50 percent of the organic radicals being methyl and no more than 2 percent being vinyl, the polydiorganosiloxane gums being endblocked with hydroxyl radicals or triorganosiloxy units where the organic radicals are defined above,
   B. from 25 to 75 parts by weight of reinforcing silica filler,
   C. from 5 to 20 parts by weight of hydroxylated diorganosilicon compound which has an average of about 2 hydroxyl radicals per molecule, at least 3 weight percent silicon-bonded hydroxyl radicals based on the weight of the hydroxylated diorganosilicon compound, and the organic radicals are selected from a combination of methyl, phenyl and vinyl, there being from 10 to 50 percent phenyl radicals, from 2 to 20 percent vinyl radicals and the remainder being methyl radicals,
   D. from 20 to 80 parts by weight fiberized blast furnace slag fibers having an average length of from 0.0001 to 0.0005 meter and a diameter of 0.00001 to 0.00001 meter, and
   E. from 0 to 10 parts by weight of alkoxy silicon compound having at least 25 weight percent siliconbonded alkoxy radical selected from methoxy, ethoxy and propoxy and any remaining monovalent organic groups attached to silicon atoms being bonded through silicon-carbon bonds and being selected from methyl, ethyl and vinyl.

2. The composition in accordance with claim 1 in which (E) is present in an amount of 2 to 10 parts by weight.

3. The composition in accordance with claim 2 in which (E) is methyltrimethoxysilane.

4. The composition in accordance with claim 1 where there is present a vulcanizing agent for the polydiorganosiloxane gum.

5. The composition in accordance with claim 1 in which the polydiorganosiloxane gum contains from 0.1 to 0.5 percent vinyl radicals.

6. The composition in accordance with claim 5 in which there is present a vinyl specific organic peroxide.

9. A method of making a silicone rubber composition consisting essentially of
   I. mixing
      A. 100 parts by weight of polydiorganosiloxane gum where the organic radicals are selected from methyl, phenyl, vinyl, ethyl and 3,3,3-trifluoropropyl and mixtures thereof, the polydiorganosiloxane gum having at least 50 percent of the organic radicals being methyl and no more than 2 percent being vinyl, the polydiorganosiloxane gum being endblocked with hydroxyl radicals or triorganosiloxy units where the organic radicals are defined above,
      B. from 25 to 75 parts by weight of reinforcing silica filler,
      C. from 5 to 20 parts by weight of hydroxylated diorganosilicon compound which has an average of about 2 hydroxyl radicals per molecule, at least 3 weight percent silicon-bonded hydroxyl radicals based on the weight of the weight of the hydroxylated diorganosilicon compound, and the organic radicals are selected from a combination of methyl, phenyl and vinyl, there being from 10 to 50 percent phenyl radicals, from 2 to 20 percent vinyl radicals and the remainder being methyl radicals,
      D. from 20 to 80 parts by weight fiberized blast furnace slag fibers having an average length of from 0.0001 to 0.0005 meter and a diameter of 0.000001 to 0.00001 meter, and
      E. from 0 to 10 parts by weight of alkoxy silicon compound having at least 25 weight percent silicon-bonded alkoxy radical selected from methoxy, ethoxy and propoxy and any remaining monovalent organic groups attached to silicon atoms being bonded through silicon-carbon bonds and being selected from methyl, ethyl and vinyl, to obtain a mixture and,
   II heating the mixture from (I) under reduced pressure for at least 30 minutes at a temperature from 100° to 200° C.

10. The method in accordance with claim 9 in which there is mixed with (A), (B), (C) and (D) from 0.01 to 1 part by weight ammonium carbonate per 100 parts by weight of polydiorganosiloxane gum.

11. The method in accordance with claim 10 in which there is also mixed with (A), (B), (C) and (D) magnesium oxide in an amount of up to 10 parts by weight per 100 parts by weight of polydiorganosiloxane.

12. The method in accordance with claim 10 in which magnesium oxide is mixed with the resulting product of (II) which has been cooled below 100° C. and is present in amounts of up to 10 parts by weight per 100 parts by weight of the polydiorganosiloxane.

13. The method in accordance with claim 11 in which the resulting product from (II) is cooled below 100° C., the polydiorganosiloxane gum of (A) contains from 0.1 to 0.5 percent vinyl radicals, and a vinyl specific organic peroxide is mixed with the cooled product of (II).

14. The method in accordance with claim 13 in which the resulting product is heated above the activation temperature of the organic peroxide and a silicone rubber is obtained.

15. A silicone rubber prepared by the method of claim 14.

16. The method in accordance with claim 12 in which the polydiorganosiloxane gum of (A) contains from 0.1 to 0.5 percent vinyl radicals, and a vinyl specific organic peroxide is mixed with the cooled product of (II).

17. The method in accordance with claim 16 in which the resulting product is heated above the activation temperature of the organic peroxide and a silicone rubber is obtained.

18. A silicone rubber prepared by the method of claim 17.

* * * * *

UNITED STATES PATENT AND TRADEMARK OFFICE
CERTIFICATE OF CORRECTION

PATENT NO. : 4,052,357   Page 1 of 3
DATED : October 4, 1977
INVENTOR(S) : James A. Marinik It is certified that error appears in the above-identified patent and that said Letters Patent are hereby corrected as shown below:

Column 1, line 12 - the phrase "use of fibers of fibrous" should read "use of fibers or fibrous"

Column 1, line 13-14 - the phrase "have been somee gums or or because" should read "have been somewhat limited because many of the fibers are incompatible with the silicone gums or because"

Column 1, line 22 - the word "silicon" should read "silicone"

Column 1, line 36 - the word "diorganosilioxane" should read "diorganosiloxane"

Column 1, line 54 - the word "usefuls" should read "useful"

Column 3, line 17 - the number "1360" should read "1316"

Column 4, line 40 - the word "comprises" should read "compromises"

Column 5, line 46 - the word "methylytrimethyoxysilane" should read "methyltrimethoxysilane"

UNITED STATES PATENT AND TRADEMARK OFFICE
CERTIFICATE OF CORRECTION

PATENT NO. : 4,052,357
DATED : October 4, 1977
INVENTOR(S) : James A. Marinik

It is certified that error appears in the above-identified patent and that said Letters Patent are hereby corrected as shown below:

Column 5, line 52 - the word "dimethylhaxane" should read "dimethylhexane"

Column 6, line 19 - the number "3,3" should read "3.3"

Column 6, line 24 - the word "dimetysiloxane" should read "dimethylsiloxane"

Column 7, line 17 - the word "dimethylsioxane" should read "dimethylsiloxane"

Column 7, line 26 - the phrase "(Pa.s (hereinafter referred" should read "(Pa.s)(hereinafter referred"

Column 8, line 11 - the word "thoxysilane" should read "ethoxysilane"

Column 11, line 47-48 - the phrase "and a diameter of 0.00001 to 0.00001 meter," should read "and a diameter of 0.000001 to 0.00001 meter,"

UNITED STATES PATENT AND TRADEMARK OFFICE
CERTIFICATE OF CORRECTION

PATENT NO. : 4,052,357

DATED : October 4, 1977

INVENTOR(S) : James A. Marinik

It is certified that error appears in the above-identified patent and that said Letters Patent are hereby corrected as shown below.

Column 11, line 51 - the phrase "conbonded" should read "con-bonded"

Signed and Sealed this

Twenty-ninth Day of December 1981

[SEAL]

Attest:

GERALD J. MOSSINGHOFF

Attesting Officer

Commissioner of Patents and Trademarks